United States Patent
Hergott

(10) Patent No.: US 7,469,497 B2
(45) Date of Patent: Dec. 30, 2008

(54) FISHING LURE ASSEMBLY

(76) Inventor: Gregory A. Hergott, 1123 8th St., Fairbury, NE (US) 68352

( * ) Notice: Subject to any disclaimer, the term of this patent is extended or adjusted under 35 U.S.C. 154(b) by 206 days.

(21) Appl. No.: 11/256,308

(22) Filed: Oct. 20, 2005

(65) Prior Publication Data

US 2007/0089352 A1      Apr. 26, 2007

(51) Int. Cl.
  *A01K 85/02*   (2006.01)
  *A01K 83/00*   (2006.01)
(52) U.S. Cl. .................. 43/42.1; 43/44.2; 43/44.82; 43/42.43; 43/42.24; 43/42.28; 43/42.11; 43/42.15
(58) Field of Classification Search .......... 43/44.2, 43/44.4, 44.6, 44.8, 44.82, 44.83, 42.1, 42.4, 43/42.41, 42.42, 42.43, 42.24, 42.26, 42.28, 43/42.36, 42.11, 42.15
See application file for complete search history.

(56) References Cited

U.S. PATENT DOCUMENTS

| | | | | |
|---|---|---|---|---|
| 13,649 A | * | 10/1855 | Johnson | 43/44.82 |
| 115,434 A | * | 5/1871 | Chapman | 43/42.28 |
| 171,769 A | * | 1/1876 | Buel | 43/44.2 |
| 218,345 A | * | 8/1879 | Wakaman | 43/42.36 |
| 315,967 A | * | 4/1885 | Spencer | 43/42.2 |
| 356,661 A | * | 1/1887 | Pfaff | 43/44.82 |
| 360,339 A | * | 3/1887 | Cooke | 43/42.36 |
| 471,548 A | * | 3/1892 | Haviland | 43/44.82 |
| 496,441 A | * | 5/1893 | Pepper, Jr. | 43/42.2 |
| 564,517 A | * | 7/1896 | Hastings | 43/44.8 |
| 567,310 A | * | 9/1896 | Gaide | 43/42.28 |
| 586,620 A | * | 7/1897 | Osborn | 43/42.24 |
| 649,508 A | * | 5/1900 | Crosby | 43/44.2 |
| 664,476 A | * | 12/1900 | Hall | 43/42.36 |
| 699,711 A | * | 5/1902 | Pyott, Jr. | 43/42.28 |
| 757,077 A | * | 4/1904 | Whipple | 43/42.11 |
| 777,491 A | * | 12/1904 | Brown | 43/42.15 |
| 787,679 A | * | 4/1905 | Koch | 43/44.2 |
| 797,161 A | * | 8/1905 | West | 43/44.4 |
| 849,036 A | * | 4/1907 | Zimmerman | 43/42.2 |
| 882,882 A | * | 3/1908 | Henzel | 43/44.82 |
| 889,505 A | * | 6/1908 | Bingenheimer | 43/44.8 |
| 913,440 A | * | 2/1909 | Sutton | 43/44.82 |

(Continued)

FOREIGN PATENT DOCUMENTS

CA       1253005 A    *   4/1989

(Continued)

*Primary Examiner*—Darren W Ark
(74) *Attorney, Agent, or Firm*—Thompson & Thompson, P.A.; Jeffrey L. Thompson

(57) ABSTRACT

A fishing lure assembly has a first multiple hook device, a second multiple hook device attached to follow behind and articulate relative to the first hook device, and a pliable dressing arranged to cover the points of the hooks of the two hook devices to resist snags. The pliable dressing can be a plurality of narrow pliable members arranged to span from a leading end of the fishing lure assembly across the points of the hooks, or a single member having an integral head portion with a plurality of long narrow bodies protruding from the head portion and spanning across the points of the hooks. A sharpened leading point or barbed head is provided at the leading end of the lure assembly for attaching the pliable dressing at the leading end. Variations in the hook devices, pliable dressings, and barbed heads for holding the dressings are also described.

11 Claims, 4 Drawing Sheets

U.S. PATENT DOCUMENTS

| | | | |
|---|---|---|---|
| 940,465 A * | 11/1909 | Koch | 43/44.2 |
| 1,025,695 A * | 5/1912 | Gibson | 43/44.4 |
| 1,110,246 A * | 9/1914 | Viers et al. | 43/44.83 |
| 1,152,698 A * | 9/1915 | Bonner | 43/44.8 |
| 1,246,150 A * | 11/1917 | Parr | 43/44.4 |
| 1,406,834 A * | 2/1922 | Fisher | 43/42.24 |
| 1,454,820 A * | 5/1923 | Readle | 43/42.28 |
| 1,547,619 A * | 7/1925 | Shannon | 43/42.24 |
| 1,582,713 A * | 4/1926 | Welch | 43/42.15 |
| 1,598,786 A * | 9/1926 | Romadke | 43/42.26 |
| 1,701,528 A * | 2/1929 | Clewell | 43/42.28 |
| 1,717,376 A * | 6/1929 | Ellerbroek | 43/44.2 |
| 1,737,683 A * | 12/1929 | Readman | 43/42.36 |
| 1,768,033 A * | 6/1930 | Deatz | 43/42.4 |
| 1,777,004 A * | 9/1930 | Lemere et al. | 43/42.24 |
| 1,781,598 A * | 11/1930 | Peckinpaugh | 43/42.25 |
| 1,791,316 A * | 2/1931 | Jordan | 43/42.15 |
| 1,791,723 A * | 2/1931 | Hampton | 43/44.8 |
| 1,792,366 A * | 2/1931 | Ettles | 43/42.15 |
| 1,820,670 A * | 8/1931 | Mays et al. | 43/42.24 |
| 1,862,187 A * | 6/1932 | Lageson | 43/44.6 |
| 1,881,947 A * | 10/1932 | Rawdon | 43/42.15 |
| 1,889,707 A * | 11/1932 | Soltis et al. | 43/42.36 |
| 1,948,983 A * | 2/1934 | Danielesuk | 43/42.1 |
| 2,000,954 A * | 5/1935 | Hopkins | 43/44.2 |
| 2,016,960 A * | 10/1935 | Dillon | 43/42.1 |
| 2,017,903 A * | 10/1935 | Johnson | 43/42.15 |
| 2,047,676 A * | 7/1936 | Edmondson | 43/44.2 |
| 2,149,054 A * | 2/1939 | Jones | 43/42.24 |
| 2,157,414 A * | 5/1939 | Johnson | 43/42.28 |
| 2,196,376 A * | 4/1940 | Anderson | 43/44.2 |
| 2,237,389 A * | 4/1941 | Ludwig | 43/44.8 |
| 2,241,367 A * | 5/1941 | Sarff | 43/42.1 |
| 2,256,173 A * | 9/1941 | Schechterle | 43/42.36 |
| 2,281,809 A * | 5/1942 | Smith | 43/42.52 |
| 2,292,517 A * | 8/1942 | Greene | 43/42.4 |
| 2,316,048 A * | 4/1943 | Clarke | 43/44.2 |
| 2,375,290 A * | 5/1945 | Docteur | 43/42.36 |
| 2,461,755 A * | 2/1949 | Miller | 43/44.8 |
| 2,476,126 A * | 7/1949 | Weiss | 43/44.2 |
| 2,522,179 A * | 9/1950 | Jensen, Sr. et al. | 43/42.36 |
| 2,562,605 A * | 7/1951 | Embree et al. | 43/44.4 |
| 2,565,956 A * | 8/1951 | Duhamel | 43/44.4 |
| 2,572,721 A * | 10/1951 | Hatt | 43/42.19 |
| 2,590,461 A * | 3/1952 | Rasch | 43/42.1 |
| 2,603,026 A * | 7/1952 | Duty | 43/44.2 |
| 2,700,242 A * | 1/1955 | Porth | 43/44.4 |
| 2,755,593 A * | 7/1956 | Thurman | 43/44.2 |
| 2,785,497 A * | 3/1957 | Berry | 43/42.26 |
| 2,792,662 A * | 5/1957 | Norton | 43/42.24 |
| 2,793,459 A * | 5/1957 | Multanen | 43/42.41 |
| 2,797,522 A * | 7/1957 | Friedrich | 43/44.8 |
| 2,850,834 A * | 9/1958 | Parrish | 43/42.11 |
| 2,854,781 A * | 10/1958 | Scozzari | 43/44.2 |
| 2,857,703 A * | 10/1958 | Parmlee | 43/42.28 |
| 2,869,279 A * | 1/1959 | Pretorius | 43/42.24 |
| 2,871,611 A * | 2/1959 | Shepard, Jr. | 43/44.2 |
| 2,878,613 A * | 3/1959 | Anderson | 43/44.2 |
| 2,880,545 A * | 4/1959 | Stadler | 43/44.2 |
| 2,886,914 A * | 5/1959 | Lievense | 43/42.15 |
| 2,900,754 A * | 8/1959 | Orlik | 43/44.2 |
| 2,911,753 A * | 11/1959 | Beckett | 43/44.2 |
| 2,912,784 A * | 11/1959 | Carlin | 43/42.24 |
| 2,922,247 A * | 1/1960 | Buss | 43/44.8 |
| 2,977,710 A * | 4/1961 | Stambaugh | 43/44.2 |
| 3,017,716 A * | 1/1962 | Hawks | 43/42.24 |
| 3,046,689 A * | 7/1962 | Woodley | 43/42.24 |
| 3,054,209 A * | 9/1962 | Wiley, Jr. | 43/42.24 |
| 3,060,620 A * | 10/1962 | Binkowski | 43/42.24 |
| 3,092,412 A * | 6/1963 | Drake | 43/44.82 |
| 3,095,664 A * | 7/1963 | Nichols | 43/42.36 |
| 3,100,360 A * | 8/1963 | Creme | 43/42.24 |
| D197,468 S * | 2/1964 | Scalzitti | D22/127 |
| 3,147,564 A * | 9/1964 | Messler | 43/42.24 |
| 3,165,858 A * | 1/1965 | Rutter | 43/42.24 |
| 3,181,265 A * | 5/1965 | Cook | 43/42.36 |
| 3,193,965 A * | 7/1965 | Jacobsen | 43/44.4 |
| 3,230,656 A * | 1/1966 | Kozjak | 43/42.1 |
| D205,038 S * | 6/1966 | Graham | D22/128 |
| 3,269,050 A * | 8/1966 | Garwood | 43/42.36 |
| 3,284,945 A * | 11/1966 | Kurtis | 43/44.2 |
| 3,293,791 A * | 12/1966 | Hinkson | 43/44.4 |
| 3,327,423 A * | 6/1967 | Kotis | 43/44.2 |
| 3,344,549 A * | 10/1967 | Peters et al. | 43/42.11 |
| 3,392,476 A * | 7/1968 | Zielaskowski | 43/44.83 |
| 3,405,474 A * | 10/1968 | Lewis | 43/42.24 |
| 3,429,066 A * | 2/1969 | McClellan | 43/42.24 |
| 3,440,757 A * | 4/1969 | McClellan | 43/42.36 |
| 3,483,650 A * | 12/1969 | Weaver | 43/42.24 |
| 3,537,207 A * | 11/1970 | McClellan et al. | 43/42.24 |
| 3,543,430 A * | 12/1970 | Brokaw | 43/42.24 |
| D222,058 S * | 9/1971 | Meadors | 43/42.26 |
| 3,645,031 A * | 2/1972 | Egles | 43/44.2 |
| 3,680,249 A * | 8/1972 | Chiarenza | 43/42.28 |
| 3,735,518 A * | 5/1973 | Kleine et al. | 43/42.15 |
| 3,760,525 A * | 9/1973 | Daughtry | 43/44.2 |
| 3,768,194 A * | 10/1973 | Murray | 43/42.1 |
| 3,803,747 A * | 4/1974 | Cartwright | 43/42.28 |
| 3,834,060 A * | 9/1974 | Wagenknecht | 43/44.8 |
| 3,839,814 A * | 10/1974 | Sykora | 43/44.2 |
| 3,848,354 A * | 11/1974 | Austad et al. | 43/44.83 |
| 3,867,781 A * | 2/1975 | Wolfe | 43/42.28 |
| 3,940,870 A * | 3/1976 | Pettersen | 43/44.2 |
| 3,942,282 A * | 3/1976 | Flagel | 43/44.2 |
| D239,447 S * | 4/1976 | Radcliff | 43/42.26 |
| 3,953,934 A * | 5/1976 | Visser | 43/42.06 |
| 3,959,912 A * | 6/1976 | Lee | 43/42.1 |
| 3,983,655 A * | 10/1976 | Kolesar | 43/42.1 |
| 3,999,325 A * | 12/1976 | Folker | 43/44.82 |
| 4,010,568 A * | 3/1977 | Mays | 43/44.4 |
| 4,074,454 A * | 2/1978 | Cordell, Jr. | 43/42.28 |
| 4,167,076 A * | 9/1979 | Weaver | 43/42.24 |
| D253,486 S * | 11/1979 | Wigutow | D22/128 |
| 4,219,956 A * | 9/1980 | Hedman | 43/42.1 |
| 4,232,470 A * | 11/1980 | Steffick, Jr. | 43/44.82 |
| 4,244,133 A * | 1/1981 | Martinek | 43/42.28 |
| 4,312,148 A * | 1/1982 | Hardwicke, III | 43/42.24 |
| 4,316,343 A * | 2/1982 | Creme | 43/42.24 |
| 4,334,381 A * | 6/1982 | Carver et al. | 43/44.8 |
| D271,232 S * | 11/1983 | Cole | D22/129 |
| 4,422,260 A * | 12/1983 | Perrick | 43/44.8 |
| 4,433,503 A * | 2/1984 | Schleif | 43/42.1 |
| 4,596,086 A * | 6/1986 | Garland | 43/42.4 |
| 4,619,069 A * | 10/1986 | Strickland | 43/42.26 |
| 4,688,347 A * | 8/1987 | Krogmann | 43/44.8 |
| 4,703,579 A * | 11/1987 | Kay | 43/42.24 |
| 4,709,501 A * | 12/1987 | Garst | 43/42.24 |
| 4,744,167 A * | 5/1988 | Steele | 43/42.1 |
| 4,750,290 A * | 6/1988 | Renaud | 43/42.11 |
| 4,750,291 A * | 6/1988 | Chilton | 43/44.82 |
| 4,777,758 A * | 10/1988 | Phillips | 43/43.2 |
| 4,790,101 A * | 12/1988 | Craddock | 43/42.24 |
| 4,791,749 A * | 12/1988 | Stazo | 43/42.24 |
| 4,796,378 A * | 1/1989 | Krueger et al. | 43/42.4 |
| 4,799,329 A * | 1/1989 | Paulsen | 43/42.28 |
| D300,449 S * | 3/1989 | Tucker | D22/128 |
| 4,848,023 A * | 7/1989 | Ryder et al. | 43/44.2 |
| 4,850,132 A * | 7/1989 | Motyka | 43/44.2 |
| 4,869,012 A * | 9/1989 | Brenholt | 43/42.1 |
| 4,870,775 A * | 10/1989 | Schrader | 43/42.24 |
| 4,888,910 A * | 12/1989 | Lewis | 43/44.82 |
| 4,893,430 A * | 1/1990 | Barfield | 43/42.24 |
| 4,914,851 A * | 4/1990 | Acker | 43/42.41 |
| 4,914,852 A * | 4/1990 | Hnizdor | 43/44.82 |

| | | | | |
|---|---|---|---|---|
| 4,930,246 A * | 6/1990 | Cunningham | 43/42.28 |
| 4,932,153 A * | 6/1990 | Paluzzi | 43/43.4 |
| 4,942,689 A * | 7/1990 | Link et al. | 43/42.24 |
| 4,967,505 A * | 11/1990 | Wulff | 43/42.15 |
| 4,969,287 A * | 11/1990 | Johnson | 43/42.24 |
| 4,976,061 A * | 12/1990 | Pool | 43/44.6 |
| 4,989,361 A * | 2/1991 | Peterson | 43/44.2 |
| 4,993,183 A * | 2/1991 | Carver | 43/42.24 |
| 4,998,372 A * | 3/1991 | Reed | 43/42.24 |
| 5,022,178 A * | 6/1991 | Carlson | 43/44.82 |
| 5,025,586 A * | 6/1991 | Pixton | 43/42.24 |
| 5,027,544 A * | 7/1991 | Schlaegel | 43/44.6 |
| 5,031,350 A * | 7/1991 | Rabideau | 43/42.1 |
| 5,040,325 A * | 8/1991 | Herrmann | 43/42.36 |
| 5,063,704 A * | 11/1991 | Phillips | 43/44.83 |
| 5,117,574 A * | 6/1992 | Perry | 43/42.36 |
| 5,119,581 A * | 6/1992 | Rudolph | 43/42.28 |
| 5,144,765 A * | 9/1992 | Keeton | 43/42.36 |
| 5,152,094 A * | 10/1992 | Strickland | 43/42.24 |
| D331,616 S * | 12/1992 | McCoy, Jr. | D22/128 |
| 5,220,743 A * | 6/1993 | McClellan | 43/44.81 |
| 5,261,182 A * | 11/1993 | Link | 43/42.36 |
| 5,274,946 A * | 1/1994 | Fusco | 43/43.2 |
| 5,303,497 A * | 4/1994 | Rabideau | 43/42.28 |
| 5,386,661 A * | 2/1995 | Davis | 43/44.8 |
| 5,425,195 A * | 6/1995 | Nakamichi | 43/44.82 |
| 5,456,039 A * | 10/1995 | Pisoni et al. | 43/42.24 |
| 5,490,345 A * | 2/1996 | Infinger | 43/42.24 |
| 5,524,385 A * | 6/1996 | Longo | 43/44.83 |
| 5,533,296 A * | 7/1996 | Jansen | 43/42.36 |
| 5,548,920 A * | 8/1996 | Peddycoart | 43/44.2 |
| 5,551,185 A * | 9/1996 | Reed | 43/42.39 |
| 5,577,340 A * | 11/1996 | Murphy | 43/42.1 |
| 5,586,405 A * | 12/1996 | Fike | 43/42.24 |
| 5,625,975 A * | 5/1997 | Imes | 43/42.24 |
| 5,664,365 A * | 9/1997 | Walden | 43/44.82 |
| 5,680,726 A * | 10/1997 | Sassone | 43/44.83 |
| 5,718,076 A * | 2/1998 | Wallrath | 43/42.11 |
| D392,715 S * | 3/1998 | Reed | D22/144 |
| 5,778,593 A * | 7/1998 | Baron | 43/44.4 |
| 5,862,623 A * | 1/1999 | MacPherson | 43/42.24 |
| D406,633 S * | 3/1999 | Saverino | D22/126 |
| 5,881,490 A * | 3/1999 | Richardson | 43/44.2 |
| 5,884,430 A * | 3/1999 | Livingston | 43/44.82 |
| 5,894,692 A * | 4/1999 | Firmin | 43/42.24 |
| 5,901,493 A * | 5/1999 | Tolliver | 43/44.82 |
| 5,950,345 A * | 9/1999 | Kilander | 43/42.24 |
| 5,960,579 A * | 10/1999 | Hampton | 43/41.2 |
| 5,974,723 A * | 11/1999 | Taibi | 43/42.11 |
| 6,006,468 A * | 12/1999 | Hnizdor | 43/44.83 |
| 6,032,400 A * | 3/2000 | Lau | 43/42.26 |
| 6,032,402 A * | 3/2000 | Jilling et al. | 43/42.4 |
| 6,050,018 A * | 4/2000 | Allen | 43/44.2 |
| 6,052,938 A | 4/2000 | Marusak et al. | |
| 6,055,802 A | 5/2000 | DiVietri | |
| 6,061,948 A * | 5/2000 | Boucek | 43/42.36 |
| 6,112,451 A * | 9/2000 | Webb | 43/42.19 |
| 6,122,856 A * | 9/2000 | Hnizdor | 43/42.28 |
| 6,141,900 A * | 11/2000 | Rudolph | 43/42.24 |
| 6,161,324 A | 12/2000 | Hugunin | |
| 6,189,257 B1 * | 2/2001 | Ulrich | 43/44.82 |
| D438,590 S * | 3/2001 | Saverino | D22/127 |
| 6,199,312 B1 * | 3/2001 | Link | 43/42.24 |
| D440,275 S * | 4/2001 | Rosenberg | D22/144 |
| 6,219,956 B1 * | 4/2001 | Hurt | 43/44.4 |
| 6,240,672 B1 * | 6/2001 | Huppert | 43/44.8 |
| 6,327,808 B1 * | 12/2001 | Zascavage | 43/42.36 |
| 6,363,651 B1 * | 4/2002 | Garst | 43/42.24 |
| 6,405,477 B1 * | 6/2002 | Huppert | 43/44.8 |
| 6,408,566 B1 * | 6/2002 | Ward, Sr. | 43/42.24 |
| D469,502 S * | 1/2003 | Shelton | D22/144 |
| 6,519,895 B1 | 2/2003 | Bennett | |
| 6,564,499 B1 * | 5/2003 | Firmin | 43/42.26 |
| 6,634,135 B1 * | 10/2003 | Rydell | 43/42.1 |
| 6,662,487 B2 * | 12/2003 | Perrone, Jr. | 43/42.1 |
| 6,775,944 B1 * | 8/2004 | Jones, Jr. | 43/42.24 |
| 6,779,295 B2 * | 8/2004 | Davidson | 43/43.16 |
| 7,059,080 B2 * | 6/2006 | Bendel | 43/42.15 |
| 7,140,147 B2 * | 11/2006 | Wacha | 43/42.47 |
| 7,234,267 B1 * | 6/2007 | Konstant | 43/42.36 |
| 7,266,922 B2 * | 9/2007 | Oelerich et al. | 43/42.24 |
| 7,272,910 B2 * | 9/2007 | Mell | 43/42.26 |
| 2003/0046858 A1 * | 3/2003 | Meraw | 43/42.28 |
| 2004/0181994 A1 * | 9/2004 | Morrow | 43/42.36 |
| 2007/0079543 A1 * | 4/2007 | Gaffney | 43/44.83 |
| 2007/0169399 A1 * | 7/2007 | More et al. | 43/44.83 |

FOREIGN PATENT DOCUMENTS

| | | | | |
|---|---|---|---|---|
| CA | 1266778 A * | 3/1990 | | |
| CH | 585504 A * | 3/1977 | | |
| DE | 3809015 A1 * | 9/1989 | | |
| DE | 29712040 U1 * | 12/1997 | | |
| EP | 689764 A1 * | 1/1996 | | |
| FR | 2588721 A1 * | 4/1987 | | |
| FR | 2796809 A1 * | 2/2001 | | |
| FR | 2840156 A1 * | 12/2003 | | |
| FR | 2845565 A1 * | 4/2004 | | |
| FR | 2858179 A1 * | 2/2005 | | |
| FR | 2865894 A1 * | 8/2005 | | |
| FR | 2871024 A1 * | 12/2005 | | |
| GB | 4879 A * | 3/1896 | | 43/42.24 |
| GB | 2067882 A * | 8/1981 | | |
| GB | 2220833 A * | 1/1990 | | |
| JP | 07203810 A * | 8/1995 | | |
| JP | 08131024 A * | 5/1996 | | |
| JP | 08266197 A * | 10/1996 | | |
| JP | 09135650 A * | 5/1997 | | |
| JP | 09252681 A * | 9/1997 | | |
| JP | 09266742 A * | 10/1997 | | |
| JP | 09266743 A * | 10/1997 | | |
| JP | 09298982 A * | 11/1997 | | |
| JP | 10075686 A * | 3/1998 | | |
| JP | 10229794 A * | 9/1998 | | |
| JP | 11018625 A * | 1/1999 | | |
| JP | 11113447 A * | 4/1999 | | |
| JP | 2000004718 A * | 1/2000 | | |
| JP | 2000217466 A * | 8/2000 | | |
| JP | 2001095427 A * | 4/2001 | | |
| JP | 2001 321022 A * | 11/2001 | | |
| JP | 2003259781 A * | 9/2003 | | |
| JP | 2003304785 A * | 10/2003 | | |
| JP | 2006174781 A * | 7/2006 | | |
| WO | WO 2005004595 A1 * | 1/2005 | | |
| WO | WO 2007/062449 A1 * | 6/2007 | | |

* cited by examiner

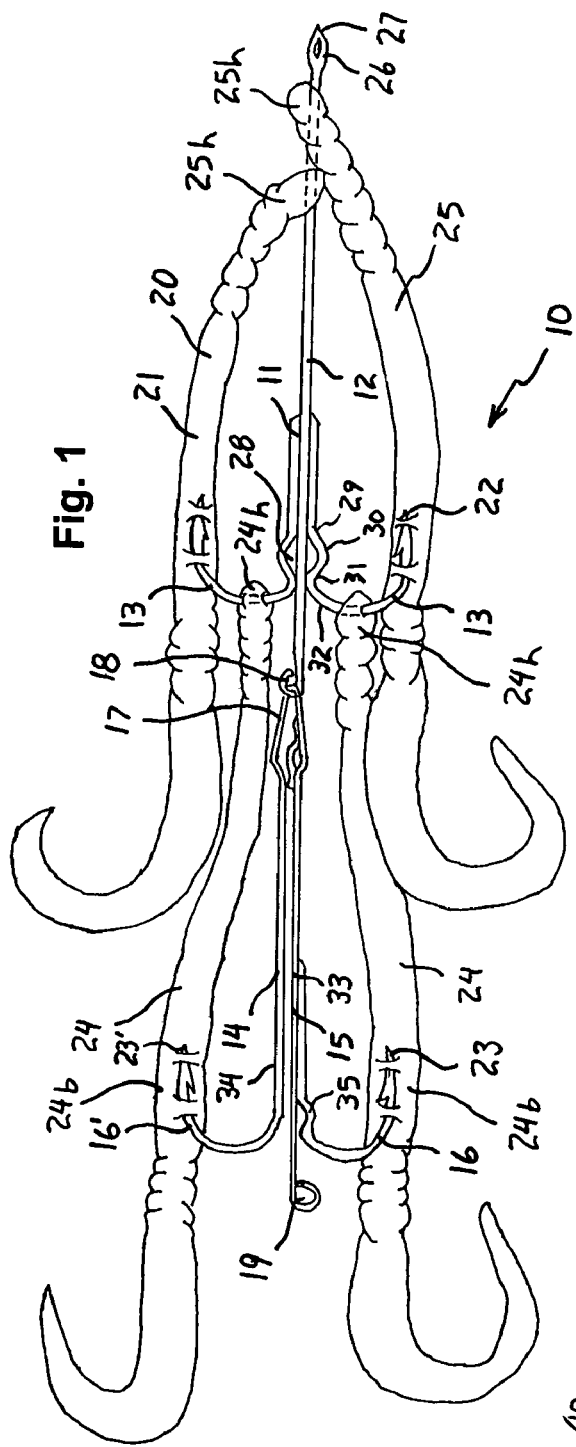

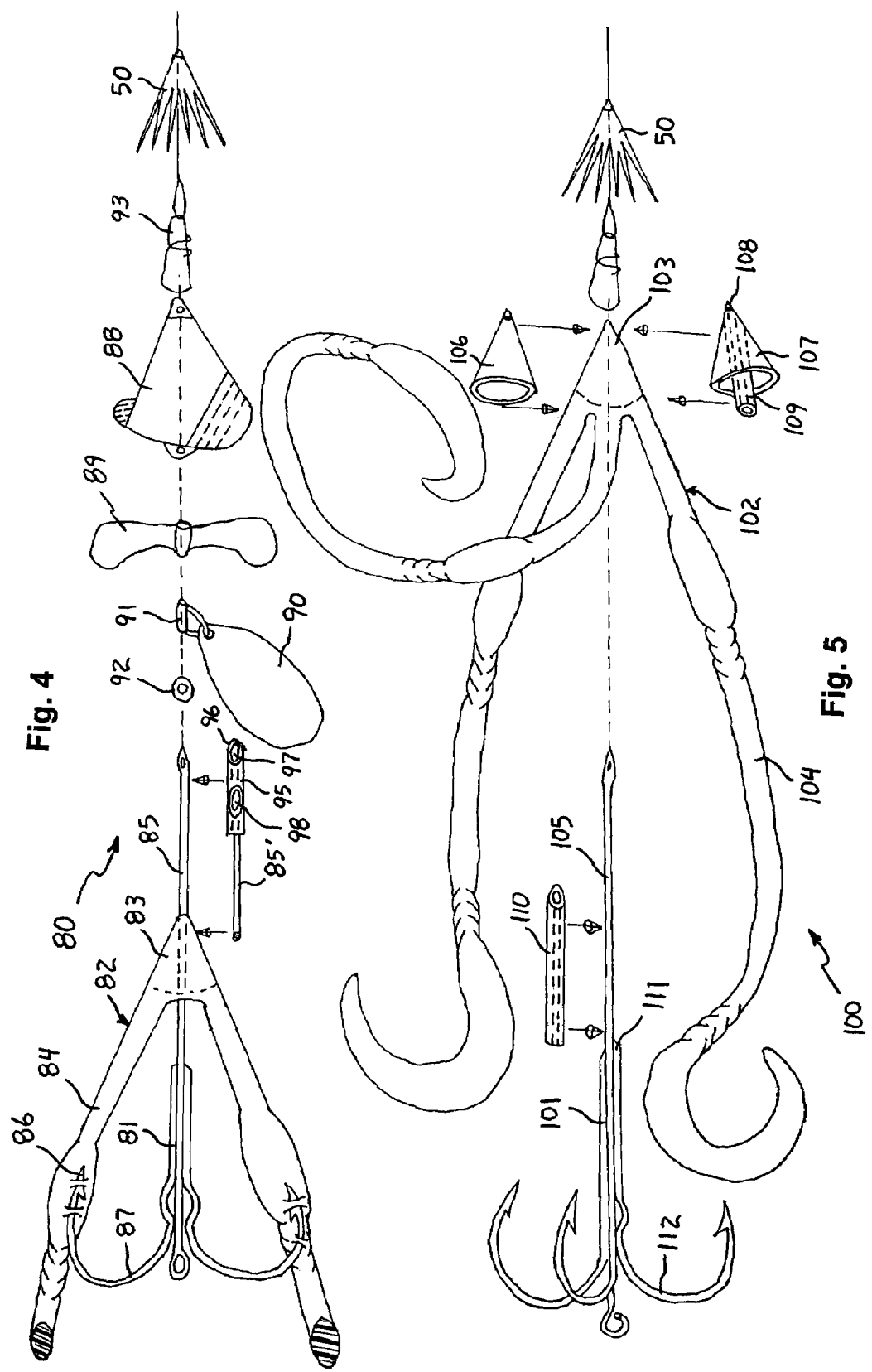

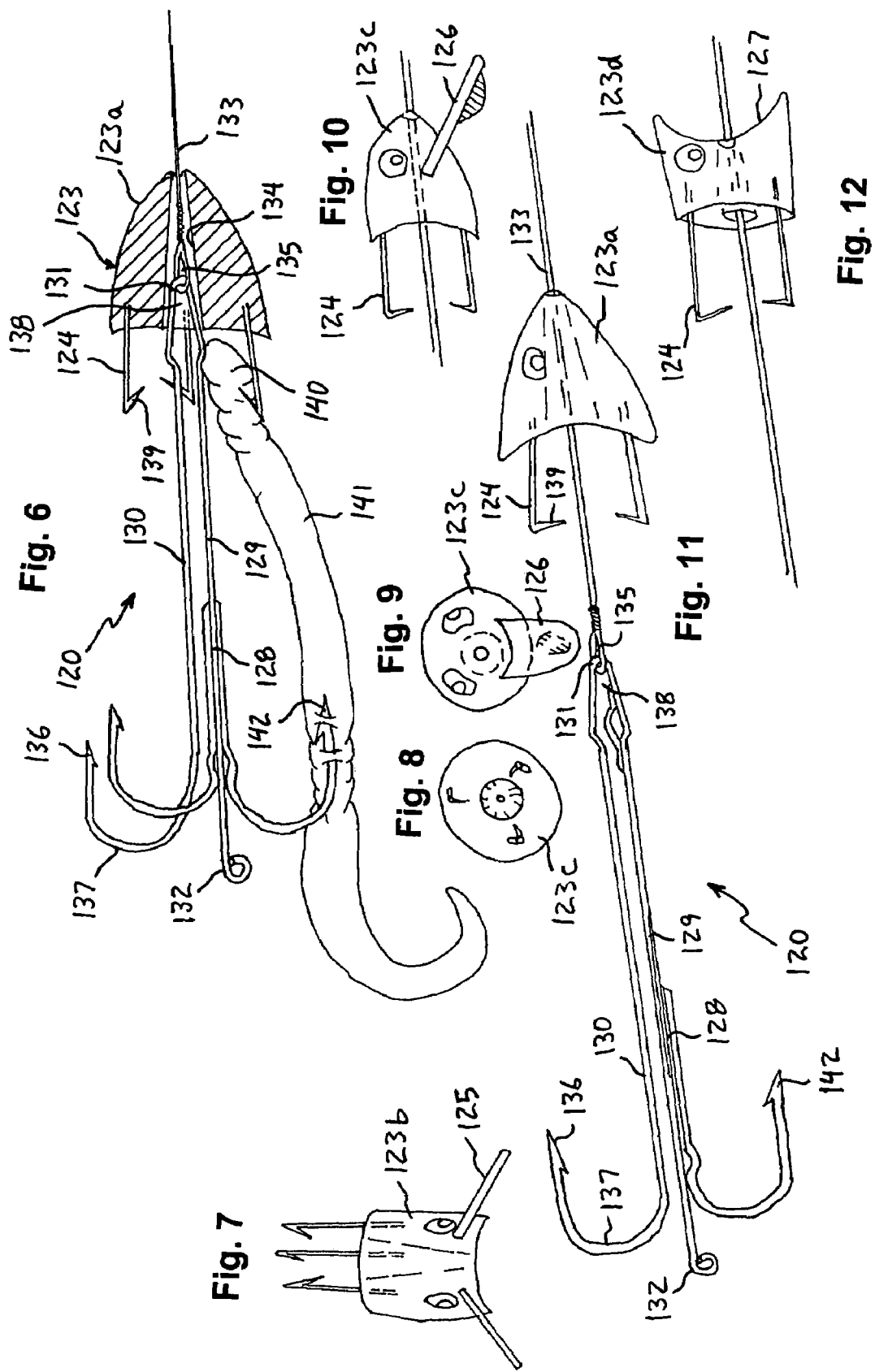

FISHING LURE ASSEMBLY

BACKGROUND OF THE INVENTION

1. Field of the Invention

The present invention relates generally to fishing equipment and, in particular, to fishing lure assemblies that use multiple hooks and artificial bait.

2. Description of the Related Art

A wide variety of fishing tackle exists on the market today. For recreational and sport fishing, it is common practice to use a lure having one or more hooks tied to a fishing line, which are baited with natural or artificial bait. The bait used generally depends upon personal choices of the user, the species of fish sought, lighting, water conditions, season, availability, and so forth. Common artificial baits include plastic worms and other pliable dressings having long and narrow shapes.

Some fishing lures are prone to snagging on submerged objects, such as weeds, brush, timber, rocks, and so forth, as the lures are reeled in through such objects. Snagging is especially a problem for fishing lures having multiple hooks. Once a fishing lure becomes snagged, the angler must then use various extraction techniques to try to retrieve the snagged lure, and often ends up breaking the line and losing the lure.

A number of devices have been developed for making fishing lures resistant to snagging. Most of these devices use some form of pliable or resilient member that extends across the gap between the leading end of the hook shank and the point of the hook. The pliable or resilient member is sufficiently flexible that a striking fish will expose the point of the hook and allow the hook to penetrate into the mouth of the fish. Examples of single hook fishing lures with snag resistant features include: U.S. Pat. No. 4,334,381 of Carver et al.; U.S. Pat. No. 4,777,758 of Phillips; U.S. Pat. No. 4,219,956 of Hedman; U.S. Pat. No. 5,220,743 of McClellan; U.S. Pat. No. 5,551,185 of Reed; and U.S. Pat. No. 6,240,672 of Huppert.

Multiple hook fishing lures with snag resistant features have also been developed. Examples of such multiple hook lures include: U.S. Pat. No. 4,433,503 of Schleif; U.S. Pat. No. 4,932,153 of Paluzzi; and U.S. Pat. No. 6,032,402 of Jilling et al.

In some fishing situations, there is an advantage to using multiple hook devices connected together in series one behind another. Examples of lure assemblies having hook devices connected in series include: U.S. Pat. No. 315,967 of Spencer; U.S. Pat. No. 913,440 of Sutton; U.S. Pat. No. 356,661 of Pfaff; U.S. Pat. No. 664,476 of Hall; and U.S. Pat. No. 1,781,598 of Peckinpaugh.

Although the prior art devices mentioned above have provided advances in the art, there still exists a need in the industry for an improved fishing lure assembly having multiple hooks connected together in series which is also resistant to snagging.

SUMMARY OF THE INVENTION

An object of the present invention is to provide a fishing lure assembly that overcomes the problems with the prior art described above, and particularly one that provides a fishing lure assembly that is adaptable to end users and to various fish species, adaptable to different manufacturing techniques, attractive, easy and economical to manufacture, simple to use, impervious to pirates, incorporates snag resistant features, and perhaps most of all, is an efficient fish catching machine.

To accomplish these and other objects, a fishing lure assembly is provided having a first multiple hook device, a second multiple hook device attached to follow behind and articulate relative to the first hook device, and a pliable dressing arranged to cover the points of the hooks of the two hook devices to resist snags. The pliable dressing can be a plurality of narrow pliable members arranged to span from a leading end of the fishing lure assembly across the points of the hooks, or a single member having an integral head portion with a plurality of long narrow bodies protruding from the head portion and spanning across the points of the hooks. A sharpened leading point or barbed head is provided at the leading end of the lure assembly for attaching the pliable dressing at the leading end. Variations in the hook devices, pliable dressings, and barbed heads for holding the dressings are also disclosed herein.

According to a broad aspect of the present invention, a fishing lure assembly is provided, comprising: a first hook device having a first shank and multiple hooks with points attached to the first shank; a second hook device having a second shank and multiple hooks with points attached to the second shank, the second hook device being attached to the first hook device so as to follow behind the first hook device and articulate relative thereto; and a pliable dressing connected between the hooks of the first hook device and the hooks of the second hook device so as to cover the points of the hooks and resist snags.

According to another broad aspect of the present invention, a fishing lure assembly having a hook assembly is provided, the hook assembly comprising: a shank having a leading end and a trailing end; at least one hook attached to the shank; a head attachment point with a sharpened leading edge protruding from the leading end of the shank; and a tail attachment point formed at the trailing end of the shank for attaching additional components in series behind the hook assembly.

According to another broad aspect of the invention, a hook assembly for use in a fishing lure assembly is provided, comprising: a shank having a leading end and a trailing end; a plurality of hooks attached to the shank; a head attachment point formed at the leading end of the shank; and a tail attachment point formed at the trailing end of the shank for attaching additional components in series behind the hook assembly. The shank comprises a first portion on which at least a first hook of the plurality of hooks are attached extending from the leading end to the trailing end, and a second portion extending in an open manner from the leading end toward the trailing end and terminating in a second hook of the plurality of hooks to facilitate attachment.

Numerous other objects and advantages of the present invention will be apparent to those skilled in this art from the following description wherein there is shown and described a preferred embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 1 is an elevation view of a fishing lure assembly having multiple hooks connected in series and a pliable dressing covering the points of the hooks according to an embodiment of the present invention.

FIG. 2 is an elevation view of a fishing lure assembly having a treble hook with a leader that passes through a leading attachment opening and forms a trailing attachment point behind the treble hook according to an embodiment of the present invention.

FIG. 3 is an elevation view of a fishing lure assembly having two treble hooks connected in series using a leader according to an embodiment of the present invention.

FIG. 4 is an exploded elevation view of a lure assembly having a sharpened leading edge, a trailing attachment point, and various other features according to an embodiment of the present invention.

FIG. 5 is an exploded elevation view of a lure assembly having a similar configuration as the embodiment shown in FIG. 4.

FIG. 6 is an elevation view of a lure assembly having a head shown in cross section with rearwardly extending barbs for attaching pliable dressing members to the lure assembly according to an embodiment of the present invention.

FIG. 7 is a front end view of another head for attaching pliable dressing members according to the present invention.

FIG. 8 is a rear end view of another head for attaching pliable dressing members according to the present invention.

FIG. 9 is a front end view of the head shown in FIG. 8.

FIG. 10 is an elevation view of the head shown in FIGS. 8 and 9.

FIG. 11 is an elevation view of a lure assembly having another head for attaching pliable dressing members according to the present invention.

FIG. 12 is an elevation view of another head for attaching pliable dressing members according to the present invention.

DETAILED DESCRIPTION OF THE PREFERRED EMBODIMENT

Figure 13:
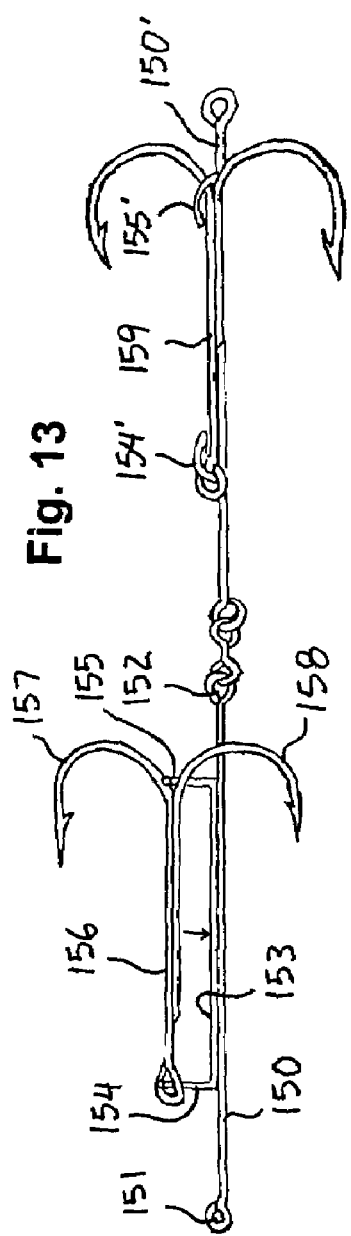
FIG. 13 is an elevation view showing an assembly process that can be used to manufacture a lure assembly according to the present invention.

A fishing lure assembly according to the present invention will now be described with reference to FIGS. 1 to 14 of the accompanying drawings.

The fishing lure assembly 10 shown in FIG. 1 includes a first hook device 11 having a first shank 12 and multiple hooks 13 attached to the first shank 12, and a second hook device 14 having a second shank 15 and multiple hooks 16 attached to the second shank 15. The first and second hook devices 11, 14 are attached together by connecting an attachment structure 17 at the leading end of the second hook device 14 to an attachment opening 18 provided at the trailing end of the first hook device 11. In this manner, the second hook device 14 follows behind the first hook device 11 and articulates relative thereto during use. The second hook device 14 also has an opening 19 at a trailing end thereof for providing an attachment point for attaching an additional hook device (not shown) in series behind the first and second hook devices 11, 14. Although the first and second hook devices 11, 14 shown in FIG. 1 are double hooks, it should be understood that the present invention can also be made using treble hooks, quad hooks, and other multiple hook devices. Some features of the present invention may also be used with single hook assemblies.

A pliable dressing 20 comprising a plurality of long, narrow pliable members 21 is used to cover the points 22, 23 of the hooks 13, 16 and resist snags. The pliable dressing 20 can be, for example, a worm-like bait, such as a plastic worm. However, other styles of long and narrow plastic baits can also be used, including those that look like grubs, eels, fish, centipedes, leeches, and so forth. The material used to make the pliable dressing 20 can be, for example, a plastic material or a plastic-like material containing ground fish byproducts. The pliable dressing 20 can also be scented with a fish attracting material in a known manner.

The pliable dressing 20 shown in FIG. 1 is assembled to the fishing lure assembly 10 by first attaching a trailing set of pliable members 24 to the first and second hook devices 11, 14. The hooks 13 of the first hook device are inserted through the head ends 24h of the trailing set of pliable members 24, and then the points 23 of the hooks 16 of the second hook device 14 are sunk into the body portions 24b of the pliable members 24. Each pliable member 24 is attached at its head end 24h to a hook 13 of the first hook device 11, and at its body portion 24b to a hook 16 of the second hook device 14 immediately behind the hook 13 of the first hook device 11 and on the same lineal axis. In this manner, the points 23 of the hooks 16 of the second hook device 14, as well as the gap between the first hook device 11 and the points 23 of the hooks 16 of the second hook device 14, are covered by the trailing set of pliable members 24 and will resist snags.

The leading set of pliable members 25 are then attached to the leading end of the lure assembly 10 and to the hooks 13 of the first hook device 11. The head ends 25h of the leading set of pliable members 25 are attached to the leading end of the fishing lure assembly 10 by inserting an attachment point 26 having a sharpened leading edge 27 through the head ends 25h of the pliable members 25. The sharpened leading edge 27 of the attachment point 26 can be formed, for example, by flattening and/or sharpening the eye at the leading end of the shank 12 of the first hook device 11. The points 22 of the hooks 13 of the first hook device 11 are then sunk into the body portions 25b of the leading set of pliable members 25. In this manner, the points 22 of the hooks 13 of the first hook device 11, as well as the gaps between the points 22 of the hooks 13 and the leading end 26 of the lure assembly 10, are covered by the leading set of pliable members 25 and will resist snags.

The first and second hook devices 11, 14 shown in FIG. 1 have different constructions, which will now be explained in further detail. The shank 12 of the first hook device 11 extends from the leading end to the trailing end of the first hook device 11, and attachment openings 26, 18 are provided at both the leading and trailing ends, respectively. The multiple hooks 13 of the first hook device 11 are attached to the first shank 12, for example, by welding, soldering, or other conventional methods.

One or more of the hooks 13 of the first hook device 11 can be formed with a leader attachment means 28 to facilitate attaching the hook device 11 to a line or leader. The leader attachment means 28 is provided by forming a bent portion at the base of the hook 13 to create a small gap between the base of the hook 13 and the first shank 12. More specifically, the hooks 13 of the first hook device 11 each have a first portion 29 attached to the shank 12, a second portion 30 which is arched or bent relative to the shank 12 to create a gap between the second portion 30 and the shank 12, and a third portion 31 that engages or nearly engages the shank 12 on an opposite side of the second portion 30 from the first portion 29. A fourth portion 32 of the hook 13 extends outwardly from the third portion 31 and provides the hook shape of the hook 13 with the hook point 22 at its distal end. The hook 13 is sufficiently flexible to allow a line or leader to be forced between the third portion 31 of the first hook device 11 and the shank 12 for fastening the line or leader to the first hook device 11. This allows the rigger to thread a line or leader with an eye tied at the end, through the leading end attachment point 26 of the hook device 11, and then loop the eye over one of the hooks 13 and pull it under the third portion 31 of the hook 13 to secure the line or leader to the first hook device 11. The hook 13 has sufficient spring tension against the shank 12 to keep the line or leader securely in place.

Another method of attaching a line or leader to the hook device 11 having the leader attachment means 28 is to thread the bitter-end (no eye made into it) of a line or leader through the leading end attachment point 26 of the first hook device 11 and then belay such bitter-end by weaving it back and forth between two or more of the adjacent hooks 13 on the first hook device 11 with each turn pulled tightly under the hook 13 between the third portion 31 of the hook 13 and the shank 12 of the first hook device 11. The line or leader so wrapped between such hooks 13 will naturally "jam" into the wedge created by the shape of the leader attachment means 28.

The second hook device 14 also has a shank 15 that extends from the leading end to the trailing end thereof, with attachment openings 17, 19 provided at both the leading and trailing ends, respectively. However, the second hook device 14 has an open shank arrangement that facilitates attachment to the trailing end of the first hook device 11. More specifically, the shank 15 of the second hook device 14 has a first shank portion 33 on which at least one of the multiple hooks of the first hook device are attached, for example, by welding, soldering, or other conventional methods. The shank 15 of the second hook device 14 further comprises a second shank portion 34 that extends in an open manner from a leading end of the first shank portion 33 toward a trailing end thereof and terminates in a single hook 16' with a point 23'. To attach the second hook device 14 to the first hook device 11, the single hook 16' at the terminal end of the second portion 34 of the second shank 15 is passed through the attachment opening 18 at the trailing end of the first hook device 11. Following the single hook 16', the open second portion 34 of the second shank 15 passes through the attachment opening 18 until the attachment opening 17 at the juncture between the first and second portions 33, 34 of the second shank 15 is mated with the attachment opening 18 at the trailing end of the first hook device 11. Although the structure of the second shank 15 remains open, the arrangement does not allow the first and second hook devices 11, 14 to become detached during normal operation.

As described above in connection with the first hook device 11, one or more of the hooks 16 of the second hook device 14 can be formed with a leader attachment means 35 to facilitate attaching a line or leader to the hook device. The leader attachment means 35 is provided by forming a bent portion at the base of the hook 16 to create a small gap between the base of the hook 16 and the first portion 33 of the shank 15. The hook 16 is sufficiently flexible to allow a line or leader to be forced between the base of the hook 16 and the first portion 33 of the shank 15 for fastening the line or leader to the second hook device 14.

In most instances, it is desirable to orient the trailing second hook device 14 in the same orientation as the leading first hook device 11 so that the pliable dressing members 24 follow from one hook device 11 to the next 14 in a substantially straight line. However, by modifying the connection between the hook devices 11, 14 to orient the trailing second hook device 14 a few or several degrees different from the leading first hook device 11, a rotation can be produced in the resulting lure 10 as it is pulled through the water. The modified connection can be made to the trailing attachment point 18 of the leading first hook device 11, or to a link between the first and second hook devices 11, 14. This rotation feature can produce desirable results as a fish attractor, particularly when reflectors or other structures are positioned along the lure assembly 10 to produce the effect of spinners without the snags normally associated with spinners.

FIG. 2 shows another variation that can be used for the first hook device and leading end of a fishing lure assembly 40 according to the present invention. In this variation, a conventional hook member 41, such as a treble hook, is used together with a length of stainless steel wire 42 to provide a hook device having attachment openings 43, 44 at leading and trailing ends, respectively. The stainless steel wire 42 is folded to make an attachment point 43 at the leading end of the fishing lure assembly 40. Then the wire 42 is woven through the eye 45 of the hook member 41 and fastened with swages 46, 47 to hold the hooks securely at the eye 45 of the hook member 41. The wire 42 extends along the shank of the hook member 41 and behind the trailing end of the hook member 41. The trailing end of the wire 42 is formed into a loop to form the attachment opening 44 at the trailing end of the hook member 41 for connecting a second hook device (not shown in FIG. 2) behind the first hook device. Metal rings 48 or other suitable structures are crimped on the wire 42 to hold the loop 44 at the trailing end.

A cone-shaped member 50 is provided at the leading end of the fishing lure assembly 40 shown in FIG. 2. The cone-shaped member 50 has a central opening 51, a leading apex 52, and a plurality of flexible members 53 that trail the leading apex 52 and extend generally along an outer surface of the cone shape. The cone-shaped member 50 is placed over the leader or line at the leading end of the fishing lure assembly 40 to resist snags as the lure assembly 40 passes through underwater vegetation and other obstructions. The flexible members 53 of the cone-shaped member 50 are stiff enough to deflect weeds, but flexible enough to slide past the teeth of predator fishes when setting the hook. The flexible members 53 function to obscure the visibility of the attachment point at the leading end of the lure assembly 40 and to spread the vegetation and other obstructions to facilitate passage of the rest of the lure assembly 40 along the same path. The central opening 51 through the cone-shaped member 50 can be sized to fit snugly over the leader or line 42 to maintain the cone-shaped member 50 in a desired position at the leading end of the fishing lure assembly 40. The cone-shaped member 50 can also be sized to fit snug over the attachment point at the leading end of the fishing lure assembly 40 to hide the attachment point deep inside the cone-shaped member 50. By covering the attachment point, a source of fouling with floating and loose debris is eliminated. The cone-shaped member 50 will also aid in holding the lure assembly straight in line with the leader or line in applications where a sideways pull would otherwise be imparted.

FIG. 3 shows another variation of a fishing lure assembly 60 according to the present invention. In this variation, two conventional hook members 61, 62, such as treble hooks, are attached together in series using a stainless steel wire 63 that extends from a leading end of the fishing lure assembly 60 to a trailing end thereof. The wire 63 is woven through the eyes 64, 65 at the leading ends of both the first and second hook members 61, 62 and extends along the respective shanks 66, 67 of the hook members 61, 62. The wire 63 is fastened with swages 68, 69, 70, 71 to hold the wire securely at the eyes 64, 65 of the hook members 61, 62. The end of the wire 62 is formed into a loop to form an attachment opening 72 at the trailing end of the lure assembly 60 for connecting additional hook devices (not shown in FIG. 3) in series behind the first and second hook members 61, 62. Metal rings 73 or other suitable structures are crimped on the wire 63 to hold the loop 72 at the trailing end.

Suitable fastening means 74, such as wire rings, are used to attach the wire 62 near the trailing ends of the hook members 61, 62. A cone-shaped member 75 is provided at the leading end of the fishing lure assembly 60 shown in FIG. 3. A pliable dressing, such as the dressing described above and shown in FIG. 1, is used to cover the points of the hooks of the first and second hook members 61, 62 to resist snags.

A fishing lure assembly 80 according to another variation of the present invention will now be described with reference to FIG. 4. In this variation, the first hook device 81 has the same structure as in FIG. 1 and therefore will not be described again in detail. The pliable dressing 82 shown in FIG. 4 has an integral head portion 83 with a plurality of long narrow bodies 84 protruding from the head portion 83. The head portion 83 of the pliable dressing 82 is coupled with the leading end of the shank 85 of the first hook device 81. The bodies 84 of the pliable dressing 82 each extend from the head portion 83 and across the points 86 of the hooks 87 on each of the first and second hook devices 81.

As shown in FIG. 4, a selection of spinner blade components can be positioned over the leading end of the shank 85 of the first hook device 81. The spinner blade components include a buzz bait blade 88, a propeller blade 89, and a swing blade 90 on a clevis 91. A thrust washer/bearing 92 can also be positioned over the shank 85 between the spinner blade components 88-91 and the pliable dressing 82 to improve the spinning action. A variety of other devices, such as weights, floats, additional pliable dressings, and so forth, can also be installed over the leading end of the shank 85 in a like manner. A swivel connector 93 can be used at the leading end of the fishing lure assembly 80 to facilitate attachment and removal from a fishing line. The spinner blade components 88-91 and/or other devices could also be used on the shank 85 without the pliable dressing 82, for example, in open water conditions where resistance to snagging is not important. A cone-shaped member 50 as described above is provided at the leading end of the fishing lure assembly 80.

Also shown in FIG. 4 is a variation for the attachment point at the leading end of the first hook device 81. Instead of a sharpened attachment point formed on the shank 85 itself, a tubular member 95 with a sharpened leading edge 96 can be secured over the leading end of the shank 85'. The tubular member 95 has a central opening 97 at its leading end, and a side port 98 through which a line or leader can pass. The sharpened leading edge 96 of the tubular member 95 will function to pierce the head end 83 of the pliable dressing 82, similar to the sharpened attachment point of the shank 85 described above. The tubular member 95 provides an additional advantage because it maintains the leading end of the lure assembly 80 in line with the line or leader, thereby eliminating any sideways pull that may be created by a straight line or leader threaded sideways through the forward attachment/leading point.

FIG. 5 shows a lure assembly 100 having a similar configuration as the embodiment shown in FIG. 4. The lure assembly 100 in FIG. 5 has a treble hook as the first hook device 101, and a pliable dressing 102 with an integral head portion 103 and a plurality of long narrow bodies 104 protruding from the head portion 103. The head portion 103 of the pliable dressing 102 is made to be coupled with the leading end of the shank 105 of the fishing lure assembly 100 similar to the pliable dressing 82 shown in FIG. 4. The head portion 103 of the pliable dressing 102 can be made of a tougher substance than the long narrow bodies 104 to better resist abrasion from snags and the like. The tougher substance can be either a separate piece inserted into the mold prior to casting the pliable dressing 102, or it can be a tougher material injected first followed by the softer material comprising the rest of the pliable dressing 102. Examples of two suitable pieces 106, 107 that can be inserted into the mold for the head portion 103 of the pliable dressing 102 are shown in FIG. 5. Both pieces 106, 107 provide a tough exterior to the head portion 103 of the pliable dressing 102 and have a generally conical shape with a small opening 108 at the tip of the apex through which a line or leader can be threaded. One of the pieces 107 also has a tough tube center 109 to further aid threading leaders and lines and so forth.

Also shown in FIG. 5 is a tubular member 110 for holding the head portion 103 of the pliable dressing 102 in a forward position on the shank 105 of the hook device 101. The tubular member 110 is placed on the shank 105 of the leading hook device 101 and extends between the head portion 103 of the pliable dressing 102 and a point 111 where at least one of the hooks 112 attaches to the shank 105. The tubular member 110 is made of a pliable material that is sufficiently soft and frangible that it can tear away or collapse to aid in setting the hook. The tubular member 110 can also be a fish attractor in the form of color, reflectiveness, taste, odor, texture, and so forth.

In the embodiments described above, the pliable dressing has been attached to the lure assembly by piercing a head portion(s) of the pliable dressing with a sharpened leading end of the lure assembly. FIGS. 6 to 12 show additional embodiments of a fishing lure assembly 120 according to the present invention in which the means for attaching the head portion 121 of the pliable dressing 122 comprises a head 123 having barbs 124 extending rearwardly therefrom, instead of a sharpened leading end. The head 123 can be selected from a plurality of interchangeable heads 123a-123d having different shapes and configurations for controlling an action or depth of operation of the lure assembly 120 in water to adapt the lure assembly 120 to various types of fishing situations. For example, the outer surface of the head 123a can be bullet shaped, as in FIGS. 6 and 11; or a head 123b having right and left paddle structures 125 can be used, as in FIG. 7; or a head 123c having a diver structure 126 can be used, as shown in FIGS. 8 to 10; or a head 123d having a dished front face 127 providing a popper feature can be used, as shown in FIG. 12.

The head 123 shown in FIG. 6 is illustrated in conjunction with a hook device 128 having a shank 129 with a side portion 130 that extends in an open manner from the leading end 131 toward the trailing end 132, similar to the trailing hook device 14 shown in FIG. 1. The heads 123a-123d shown in FIGS. 6 to 12 are designed to be positioned over and to substantially cover a point where the line or leader 133 attaches to the leading end 131 of the hook device. A tunnel opening 134 through the head 123 has a tapered configuration that provides a press fit using friction to keep the head 123 in the desired position over the attachment point.

The heads 123 are affixed to the fishing lure assembly 120 by passing the leader eye 135 of the line or leader 133 through the tunnel opening 134 at the front of the head 123, and then putting the eye 135 of such line or leader 133 over the point 136 of the open shank hook 137 and moving the leader eye 135 around to the open attachment opening 138 at the leading end 131 of the hook device 128. The head 123 is then moved over the leading end 131 of the hook device 128 where it is held in place by friction. The rearwardly extending barbs 124 of the heads 123 have barbed tips 139 designed to pierce the head ends 140 of the long and narrow pliable dressing members 141 and hold the head ends 140 of the pliable members 141 in the desired position. The pliable dressing members 141 are first attached to the barbed holders 139 of the head 123, and then to the points 136, 142 on the hook device 128. As in the embodiments described above, the pliable dressing members 141 span the gap between the leading end of the lure assembly 120 and the points 136, 142 of the hooks, thereby creating a snag resistant assembly.

FIG. 13 shows a process that can be used to manufacture a lure assembly according to the present invention using conventional hook devices. The process starts with a shank member 150 having attachment openings 151, 152 at its leading and trailing ends. An attachment member 153 is secured to the shank member 150 between its leading and trailing ends, and the attachment member 153 has coupling parts 154, 155 that extend outwardly from the shank member 150. A conventional hook member 156 having multiple hooks 157, 158, such as a double hook or a treble hook, is then placed over the attachment member 153 with one of the coupling parts 154 extending through the attachment opening 151 at the leading end of the hook member 156, and the other coupling part 155 extending between two of the hooks 157, 158 near the tail of the hook member 156. The coupling parts 154, 155 are then bent over to secure the hook member 156 to the shank member 150. The trailing hook member 159 shown on the right side of FIG. 13 shows the condition in which the coupling parts 154', 155' have been bent into a crimped position to secure the hook member 159 to the shank member 150'.

Figure 14:
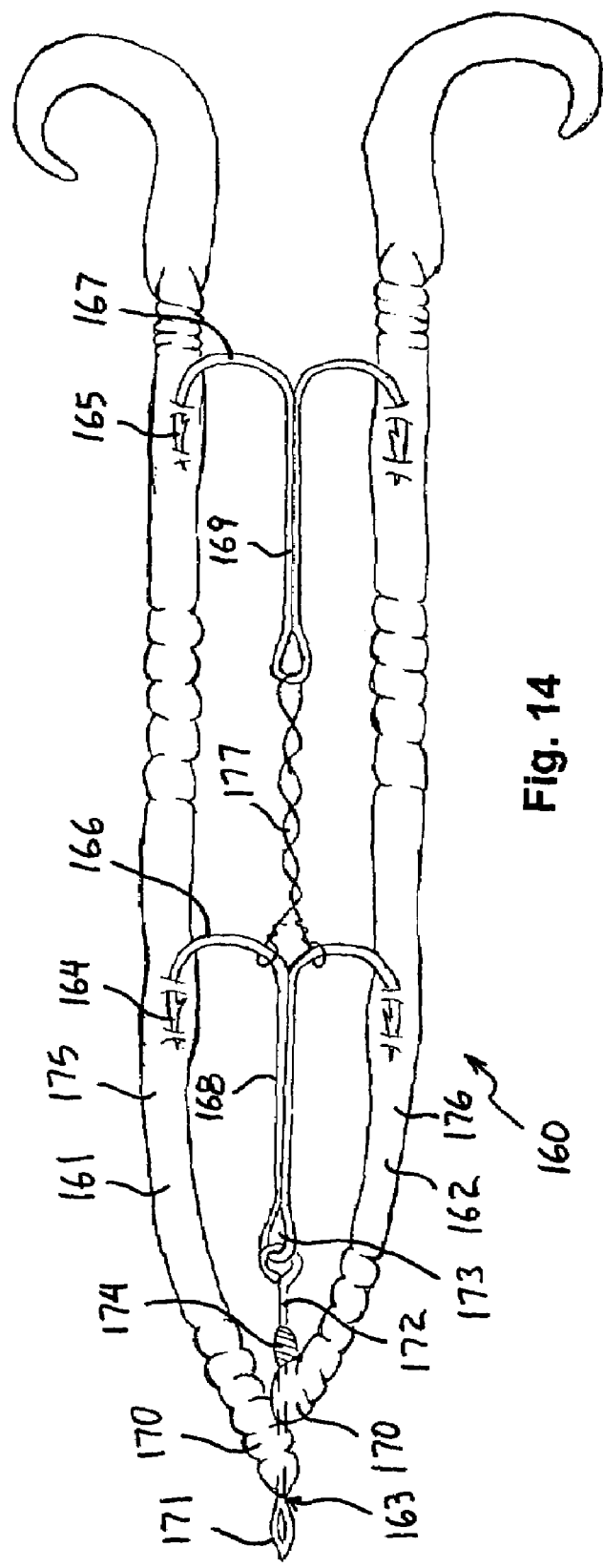
FIG. 14 is an elevation view of a lure assembly according to the present invention in which two hook devices are connected together using a bridal-type connection.

FIG. 14 shows a fishing lure assembly 160 according to another embodiment of the present invention in which the pliable dressing comprises a plurality of long and narrow pliable members 161, 162, and each of the pliable members 161, 162 is arranged to span from a leading end 163 of the fishing lure assembly 160 across the points 164, 165 of the hooks 166, 167 on each of the leading and trailing hook devices 168, 169. The pliable members 161, 162 in this embodiment are attached at their head ends 170 by using a sharpened leading edge 171 of a leader 172 attached to and protruding from the leading attachment point 173 of the first hook device 168. The sharpened leading edge 171 of the leader 172 pierces the head ends 170 of the pliable members 161, 162, and the head ends 170 are maintained at a desired position by a stopper structure 174 provided on the leader. The points 164, 165 of the hooks 166, 167 are then sunk into the body portions 175, 176 of the pliable members 161, 162 in the manner illustrated to provide a snag resistant lure assembly.

FIG. 14 also illustrates another method of attaching the trailing hook device 169 to the leading hook device 168. In this embodiment, a wire bridle 177 is used to attach two conventional hook members together to construct the lure assembly from readily available materials.

It will be appreciated that various changes and modifications to the fishing lure assemblies illustrated in the accompanying drawings can be made without departing from the scope of the present invention. For example, any of the hook devices shown with attachment points at their trailing ends can be used to connect an additional hook device in series to follow behind the first. Also, certain features and advantages of the present invention can be attained using hook devices having only single hooks, or hook devices having two, three or four hooks. In the case of hook devices having multiple hooks, the multiple hooks attached to a common shank need not be arranged at the same position along the length of the shank, but rather, may be staggered at different longitudinal positions along the shank.

While the invention has been specifically described in connection with specific embodiments thereof, it is to be understood that this is by way of illustration and not of limitation, and the scope of the appended claims should be construed as broadly as the prior art will permit.

What is claimed is:

1. A fishing lure assembly, comprising:
    a first hook device having a first shank and multiple hooks with points attached to the first shank;
    a second hook device having a second shank and multiple hooks with points attached to the second shank, said second hook device being attached to the first hook device so as to follow behind the first hook device and articulate relative thereto;
    a pliable artificial dressing connected between the hooks of the first hook device and the hooks of the second hook device so as to cover the points of the hooks and resist snags, said pliable dressing comprises an integral head portion with a plurality of long narrow bodies protruding from said head portion;
    an attachment point with a sharpened leading edge protruding at a leading end of the lure assembly for attaching the head portion of the pliable dressing;
    said long narrow bodies of the pliable dressing each extending from the head portion to a point of a respective one of the hooks of the first hook device and then to a point of a respective one of the hooks of the second hook device with each of the points of the hooks being covered by one of the long narrow bodies so that the pliable dressing spans across respective gaps between the first shank and the points of the hooks of the first and second hook devices to resist snags; and
    a cone-shaped member separate from said pliable dressing, said cone-shaped member having a central opening, a leading apex and a plurality of flexible members trailing the leading apex and extending generally along an outer surface of the cone shape, said cone-shaped member being adapted to be placed over a leader or line at the leading end of the lure assembly to resist snags.

2. The fishing lure assembly according to claim 1, wherein said attachment point with a sharpened leading edge is formed on a leader attached to a leading end of the first hook device.

3. The fishing lure assembly according to claim 1, wherein said integral head portion of the pliable dressing is made of a tougher substance than said long narrow bodies to resist abrasion from snags.

4. The fishing lure assembly according to claim 1, wherein said first hook device comprises an opening at a trailing end thereof for attaching the second hook device to the first hook device.

5. The fishing lure assembly according to claim 4, wherein said second hook device comprises an opening at a trailing end thereof for providing an attachment point for attaching an additional hook device in series behind the first and second hook devices.

6. The fishing lure assembly according to claim 1, wherein the first shank of said first hook device has an attachment opening at both a leading end and a trailing end thereof, and said multiple hooks of the first hook device are attached to the first shank.

7. The fishing lure assembly according to claim 1, wherein the second shank of said second hook device comprises a first shank portion on which at least one of said multiple hooks is attached, and a second shank portion which extends in an open manner from a leading end of the first shank portion toward a trailing end thereof and terminating in another hook of said multiple hooks.

8. The fishing lure assembly according to claim 7, wherein the first shank portion has an attachment opening formed at said trailing end thereof.

9. The fishing lure assembly according to claim 1, further comprising a tubular member for holding the head portion in a forward position on the assembly, said tubular member comprising a pliable material placed on the first shank of the assembly and extending between the head portion of the pliable dressing and a point where at least one of the hooks attaches to the first shank.

10. The fishing lure assembly according to claim 1, wherein said attachment point comprises a tubular member secured over the leading end of the first shank, said tubular member having the sharpened leading edge for piercing the pliable dressing, and a side port through which a line or leader can pass.

11. The fishing lure assembly according to claim 1, wherein said long narrow bodies of the pliable dressing are worm-like plastic bodies.

* * * * *